(12) United States Patent
Beck et al.

(10) Patent No.: US 7,717,491 B2
(45) Date of Patent: May 18, 2010

(54) SUN VISOR FOR USE IN A VEHICLE AND METHOD FOR PRODUCING A SUN VISOR

(75) Inventors: Frederic Beck, Boucheporn (FR);
Stehane Jung, Enchenberg (FR);
Christian Delus, Retonfey (FR);
Gabriel Stricher, Laning (FR); Patrick Welter, Lachambre (FR); Frederic Selvini, Falck (FR)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 0 days.

(21) Appl. No.: 10/588,589

(22) PCT Filed: Jan. 7, 2005

(86) PCT No.: PCT/EP2005/000079

§ 371 (c)(1),
(2), (4) Date: Apr. 18, 2007

(87) PCT Pub. No.: WO2005/080106

PCT Pub. Date: Sep. 1, 2005

(65) Prior Publication Data

US 2007/0267886 A1 Nov. 22, 2007

(30) Foreign Application Priority Data

Feb. 13, 2004 (DE) ........................ 10 2004 007 489

(51) Int. Cl.
*B60J 3/00* (2006.01)

(52) U.S. Cl. ..................................................... 296/97.1

(58) Field of Classification Search ................. 296/97.1
See application file for complete search history.

(56) References Cited

U.S. PATENT DOCUMENTS

| 4,653,798 | A | * | 3/1987 | White et al. | ................ 296/97.5 |
| 4,858,983 | A | * | 8/1989 | White et al. | ............. 296/97.13 |
| 5,054,839 | A | * | 10/1991 | White et al. | ................ 296/97.1 |
| 5,078,445 | A | * | 1/1992 | VandenBerge et al. | ..... 296/97.1 |
| 5,080,420 | A | * | 1/1992 | Hemmeke et al. | .......... 296/97.1 |
| 5,205,639 | A | * | 4/1993 | White et al. | ................. 362/137 |
| 5,308,137 | A | * | 5/1994 | Viertel et al. | ............... 296/97.1 |

(Continued)

FOREIGN PATENT DOCUMENTS

DE 75 26 219 1/1976

(Continued)

OTHER PUBLICATIONS

Search Report by European Patent Office for International Application No. PCT/EP2005/000079; mailing date May 10, 2005; 2 pages.

*Primary Examiner*—Glenn Dayoan
*Assistant Examiner*—Paul A Chenevert
(74) *Attorney, Agent, or Firm*—Foley & Lardner LLP (57) ABSTRACT

A component, in particular a sun visor that is designed for use in a vehicle, is described having a structural part and a cover part, the cover part being connected to the structural part by a removable connection. In order to produce the connection, the cover element performs a connection displacement in relation to the structural part in a tangential direction to at least one main extension direction of the cover element.

16 Claims, 7 Drawing Sheets

U.S. PATENT DOCUMENTS

| | | | | |
|---|---|---|---|---|
| 5,338,082 A | * | 8/1994 | Miller | 296/97.1 |
| 5,365,416 A | * | 11/1994 | Peterson | 362/135 |
| 5,580,118 A | | 12/1996 | Crotty, III | |
| 6,641,198 B2 | * | 11/2003 | Crotty et al. | 296/97.1 |
| 6,669,262 B1 | * | 12/2003 | Crotty et al. | 296/97.1 |
| 6,824,188 B1 | * | 11/2004 | Brown et al. | 296/97.1 |

FOREIGN PATENT DOCUMENTS

| | | |
|---|---|---|
| DE | 28 14 656 A1 | 10/1979 |
| JP | 2002-127819 | 5/2002 |
| JP | 2002127819 A * | 5/2002 |

* cited by examiner

SUN VISOR FOR USE IN A VEHICLE AND METHOD FOR PRODUCING A SUN VISOR

CROSS REFERENCE TO RELATED APPLICATIONS

The present Application claims the benefit of priority to the following International Application: PCT Patent Application No. PCT/EP2005/000079 titled "Component, In Particular Sun Visor Designed For Use In A Vehicle And Method For Producing Component" filed on Jan. 7, 2005, which claims priority to German Patent Application No. DE 102004007489.5 filed on Feb. 13, 2004 (which are both incorporated by reference in their entirety).

FIELD

The invention relates to a component, in particular a sun visor that is designed for use in a vehicle.

BACKGROUND

Components, such as sun visors, which are used in particular in the interior of a vehicle, are generally known. It is desireable that they be lightweight and cost-effective. On the other hand, it is also desireable that their assembly be cost-effective and they have a long service life, during which they are sometimes subjected to extreme situations with regard to temperature conditions and with regard to oscillating and/or vibrating conditions. Furthermore, at the end of their useful life, it is desireable that such components be easily accessible to material utilization (recycling). Also, it is desireable that such components be designed to be aesthetically attractive.

With such known components it is common for so-called snap-in connections—also called clip connections—to be used for the external fastening of individual parts to structural elements of the components. Such snap-in connections generally engage with an insertion element in a corresponding recess of the component, either the insertion element or, however, the component itself being first deflected and then snapped in, during the connection, in the region of its recess. Here, the insertion movement is generally arranged substantially perpendicular to the surface and/or to the face of the component to be covered (as are the insertion element and the recess).

In order to ensure a stable hold, a plurality of such insertion elements are generally present which has the result that, during assembly, the plurality of insertion elements usually have to be aligned in their corresponding recesses, before they may be finally snapped in. As these two steps are movements in the same direction (namely the insertion of the insertion elements into the recesses), the two steps may be combined, so that, for example, one of the plurality of insertion elements is already snapped in, meanwhile a further insertion element would have to be still further aligned, which, however, is sometimes no longer possible as the one insertion element is already snapped in. Therefore, with conventionally known components, the assembly is typically awkward, and is difficult and expensive to automate and suffers from certain drawbacks, for example a high rejection rate.

The object of the invention, therefore, is to provide a component, in particular a sun visor that is designed for use in a vehicle, which avoids the drawbacks of the prior art.

SUMMARY

This object is achieved according to the embodiments of the invention by a component, in particular a sun visor that is designed for use in a vehicle, the component comprising a structural part and a cover element. The cover element being connected to the structural part by a removable connection and a connecting movement of the cover element relative to the structural part to produce the connection, in a direction substantially tangential to at least one main extension direction of the cover element. As a result, during assembly of the component, it is easily possible for the cover element to be clearly positioned relative to the structural part and, by a relative movement, to be positioned in a first direction and subsequently, for producing the connection, for the cover element to be moved in a further direction, namely substantially tangentially to the main extension direction.

According to the embodiments of the invention, it is preferred that the cover element has at least one main extension direction substantially in a plane and/or substantially in a cylindrical peripheral surface and that the connecting movement is carried out substantially in the plane and/or substantially in the cylindrical peripheral surface. Generally the cover element is used to cover, for example, an edge of another element arranged against, in or on the component so that when the component is fully assembled, the cover element has an intended mating surface of a specific extension with the remaining component. This intended mating surface may be either substantially planar so that at least one main extension direction of the cover element substantially extends in one plane. On the other hand, this intended mating surface may also be curved—in one or two spatial directions. With a curvature in one spatial direction, the intended mating surface corresponds to a cylindrical peripheral surface. With a curvature in two spatial directions, the intended mating surface corresponds to a spherical shell. In each of these cases, it is possible according to the embodiments of the invention for the cover element to be moved relative to the remaining component, i.e. in particular relative to the structural part, in the intended mating surface—i.e. for example of a plane, a cylindrical peripheral surface or a spherical shell.

It is further preferred that at least one first sliding element of the structural part or of the cover element is arranged in the plane or in the cylindrical peripheral surface. According to an embodiment of the invention, such a sliding element is preferably used as a stop for the positioning movement to be carried out during the first production step of the component.

It is further preferred that the at least one first sliding element cooperates with at least one second sliding element for locking the cover element relative to the structural part, at least relative to a movement perpendicular to the plane or to the cylindrical peripheral surface. As a result, it is easily possible for locking to be achieved between the cover element and the structural part.

It is furthermore advantageous if a snap-in connection is provided between the cover element and the structural part for locking the cover element relative to the structural part, relative to a movement in the plane or in the cylindrical peripheral surface. As a result, it is possible to lock the connection of the structural part to the cover element in an additional direction.

It is further preferred that the snap-in connection is reversibly removable. Then the connection may also be undone, if required. However, such a reversible connection may create the possibility of a greater likelihood of error by inadvertent release of the connection.

It is further advantageous if the snap-in connection is only irreversibly removable. As a result, it is substantially ensured that it is not possible to release the connection inadvertently, so that it is only possible to separate the connection by destroying at least one part of the snap-in connection.

According to a particularly preferred embodiment where the cover element is provided in the manner of a frame and the component is a sun visor with a mirror, the cover element is provided at least for covering the edge region of the mirror. In this case, it is easily possible to produce an aesthetic cover with a sealed edged transition region and/or to produce a cover around a mirror.

A further embodiment of the present invention is a method for producing a component, in particular, a cover element and a structural part being arranged, in a first step, relative to one another such that at least one first sliding element and at least one second sliding element are at least partially in contact, a connecting movement of the cover element relative to the structural part being carried out, in a second step, in a direction substantially tangential to at least one main extension direction of the cover element. As a result, the manufacture of such components may be improved, in particular accelerated and reduced in cost.

BRIEF DESCRIPTION OF THE FIGURES

The embodiments of the invention are described in more detail hereinafter with reference to the drawings, in which.

DETAILED DESCRIPTION

Figure 1:
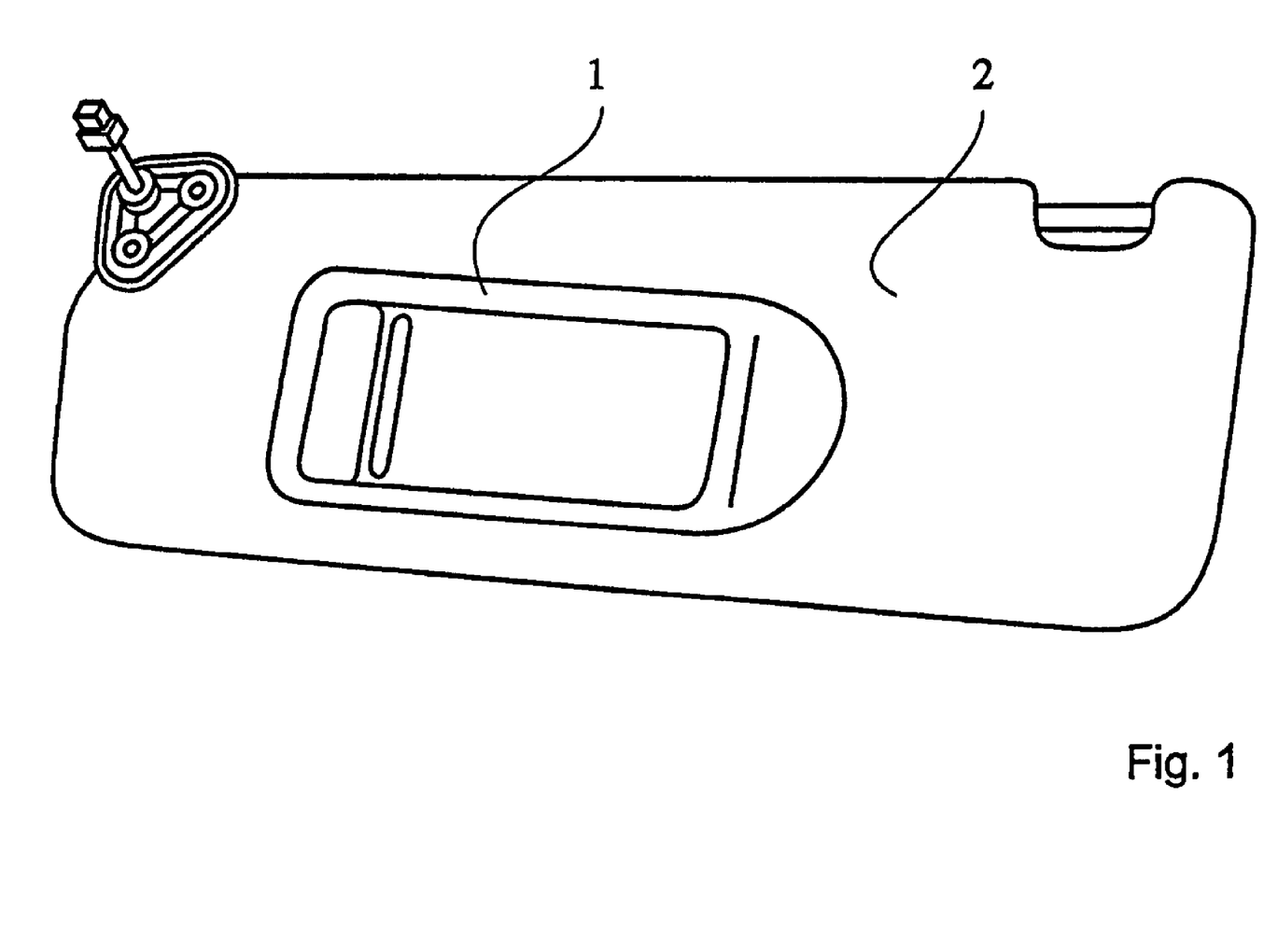
FIG. 1 shows a perspective view of a sun visor as an example of a component according to one embodiment of the invention.

A perspective view of a sun visor 2 is shown in FIG. 1 as an example of a component 2 according to the invention. The sun visor 2 has a cover element 1 which surrounds a mirror region, not denoted further by a reference numeral in FIG. 1, and/or of which the edge region at least partially covers. The mirror may be provided as a vanity mirror or the like and, in particular, may have illumination, but illumination not being obligatory. Moreover, it may be provided that the mirror region and/or the mirror—additionally to the cover element—has a cover not denoted further by a reference numeral.

Figure 2:
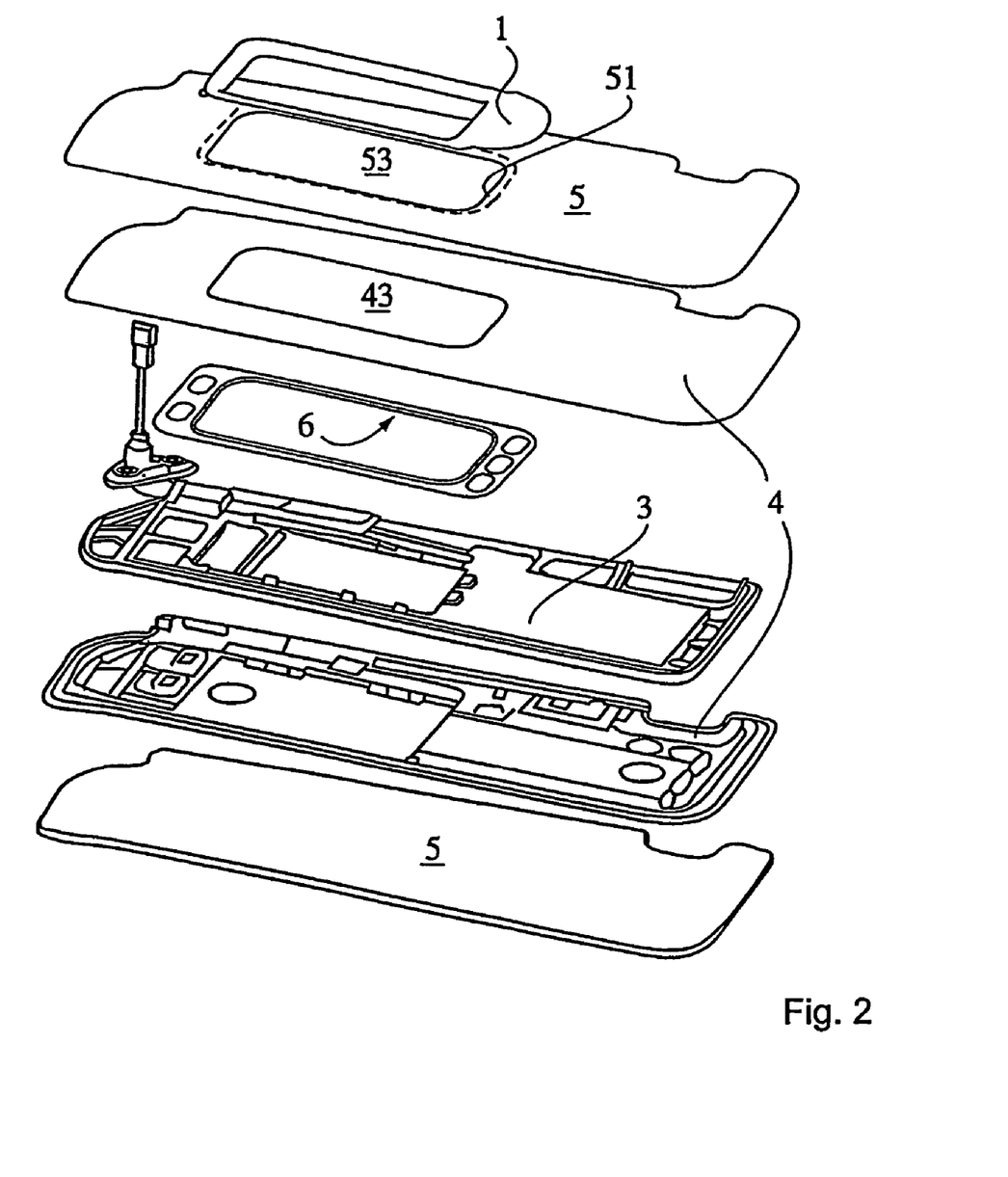
FIG. 2 shows an exploded view of the construction of the sun visor and/or the component, with a cover element being visible.

An exploded view is illustrated in FIG. 2 for clarification of the construction of the sun visor 2 and/or the component 2, in particular a decorative material 5 and (at least) one molded body 4 being visible. The sun visor 2, as an example of the component 2 according to the illustrated embodiment of the invention, comprises respectively on its upper face and its lower face a decorative material 5 and a molded body 4. In the example, a structural part 3 is located between the molded bodies 4, on which structural part, for example, the electrical structural elements and/or leads of the component 2 and/or the sun visor 2 (not denoted further by reference numerals in FIG. 2) are arranged. The presence of an upper face and a lower face of the sun visor 2 is because the sun visor 2 generally has a visible face on both sides, i.e. it is possible for the user to see both the lower face and the upper face, depending on the folded position of the sun visor. This feature does not have to be provided in every component 2 according to the invention in and/or on a vehicle, in particular a motor vehicle. For example, for components 2 provided for cladding a door or a further component of the vehicle interior, it is possible that said components have only one visible face. In this case, such a component 2 could also have only one molded body 4 and one decorative material 5.

Only the upper face of the sun visor 2 is described in more detail hereinafter. The upper face of the sun visor 2 has a molded body 4 and a decorative material 5, the decorative material 5 (and in the illustrated embodiment, also the molded body 4) having an aperture. The aperture in the decorative material 5 is denoted by the reference numeral 53 and the aperture in the molded body 4 is denoted by the reference numeral 43. In the sun visor 2, as an example of a component 2, the apertures 43, 53 are present, in particular, for the mirror provided on one side. However, with another component 2, corresponding apertures 43 could also be used for other purposes. According to the illustrated embodiment of the invention, the decorative material 5 has an edge region 51 around the aperture 53, in which the decorative material 5 is fastened to the molded body 4 (so that, for example, no wrinkling of the decorative material 5 occurs). This may, for example, occur by bending back the decorative material 5 or even by means of an additional fastening element 6.

Figure 3:
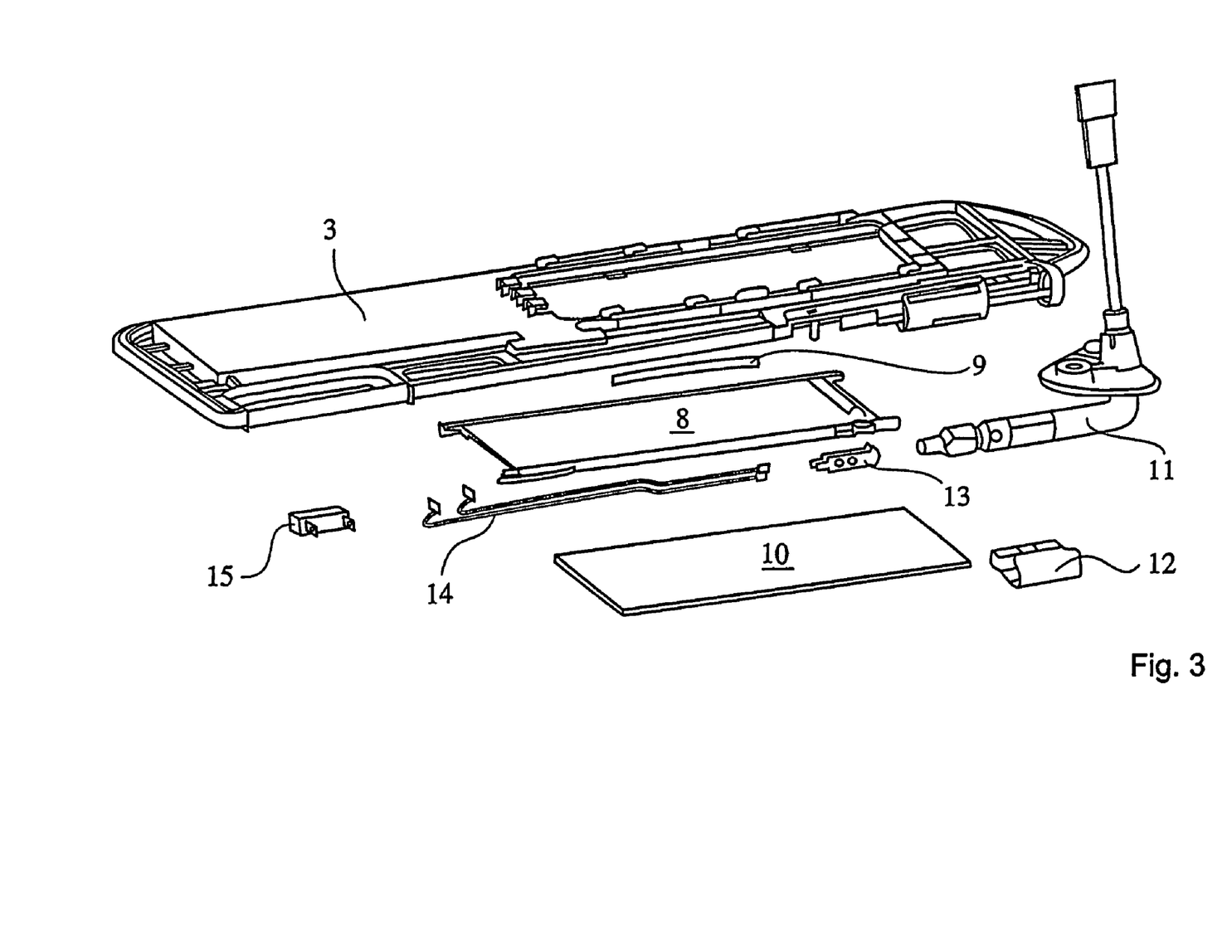
FIG. 3 shows an exploded view of elements relating to the electrical and mechanical functionality of the component.

An exploded view is illustrated in FIG. 3 of exemplary elements for providing the electrical and mechanical functionality of the component 2, which are all substantially integrated within and/or mounted on the structural part 3. For example a sliding cover 8, a cover spring 9, a mirror 10, a pivot device 11, a pivot spring 12 and an electrical connection unit are fastened to the structural part 3, the electrical connection unit consisting, for example, of two connectors 13, two leads 14 and a switch 15. The pivot device 11 and the pivot spring 12 make it possible for the sun visor 2 to be pivotably arranged.

Figure 4:
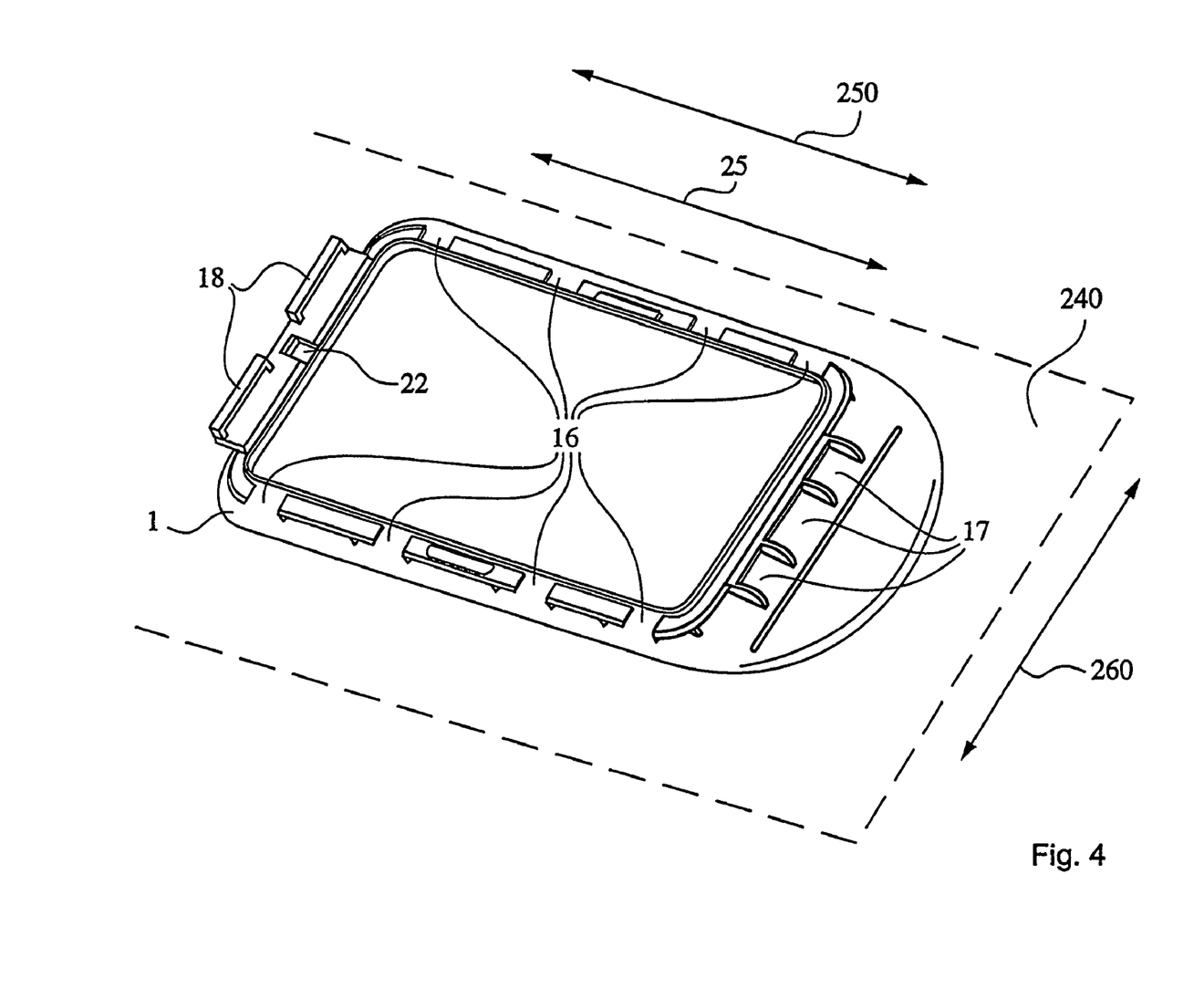
FIG. 4 shows the rear face of the cover element together with an indication of a main extension direction of the cover element and the substantially tangential direction.

The rear face of the cover element 1 is illustrated in FIG. 4 (i.e. the face facing away from the visible face of the cover element 1), together with an indication of a main extension direction 250 of the cover element 1 and the direction 25 provided substantially tangentially to the main extension direction 250. The cover element 1 has a plurality of first sliding elements 16, 17, 18, four thereof, for example, being respectively provided on the longitudinal sides of the cover element 1 being configured, for example, in the manner of a frame and being denoted by the reference numeral 16, three, for example, being provided on one of the narrow sides of the cover element 1 and being denoted by the reference numeral 17 and two, for example, being provided on the other of the narrow sides of the cover element 1 and being denoted by the reference numeral 18. The first sliding elements 16, 17 18 are considered hereinafter, irrespective of their position on the cover element 1; also it is possible to provide just one first sliding element 16. The cover element 1 also has a first snap-in element 22.

In the illustrated embodiment, the cover element 1 has a first main extension direction, 250 and a further main extension direction 260 which both form a plane 240. Apart from local recesses and/or projections, the plane 240 forms an intended mating surface with the remaining component 2, which is designed to be at least partially covered by the cover element 1.

Figure 5:
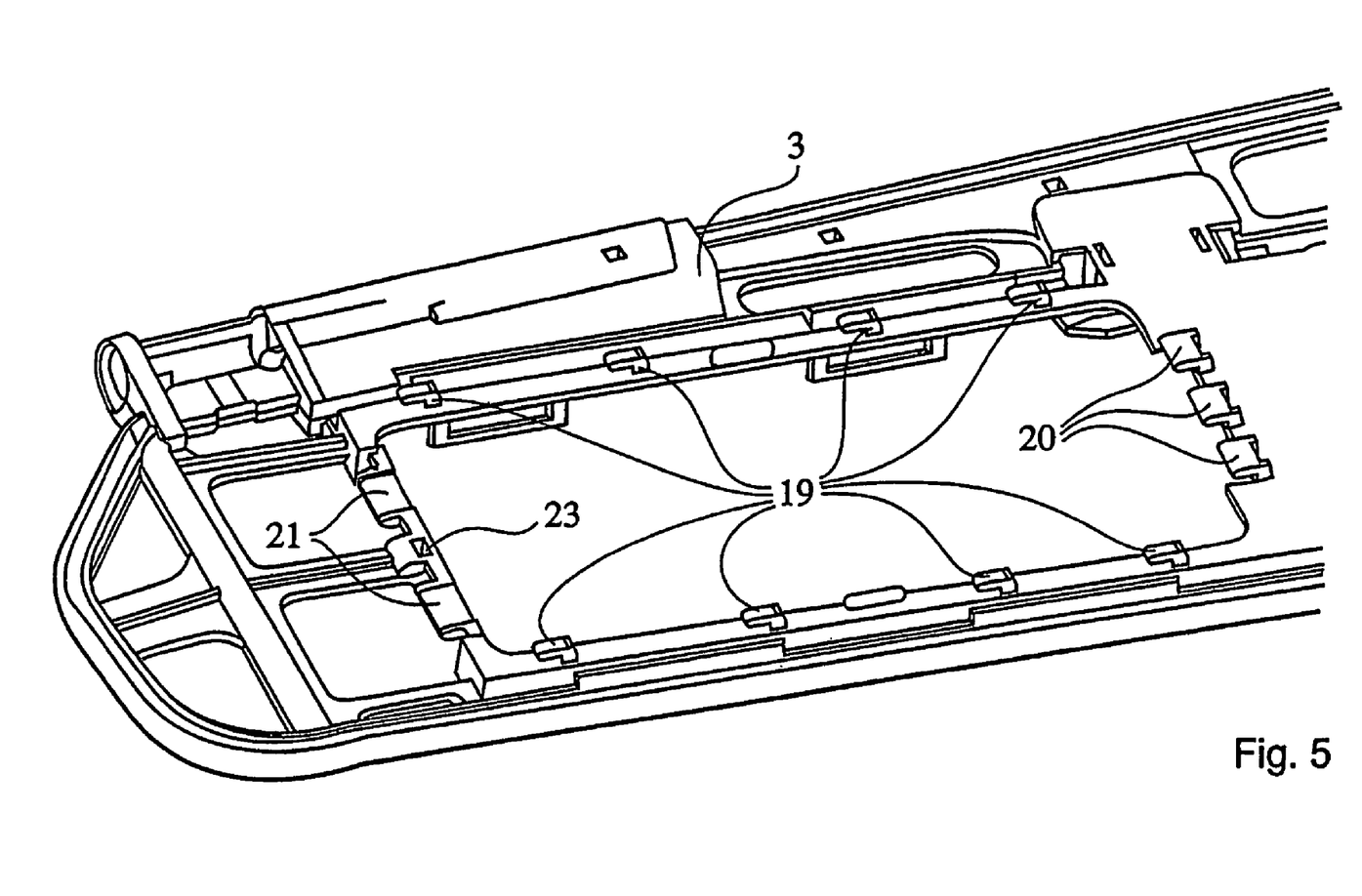
FIG. 5 shows the front face of a structural part of the component according to an embodiment of the invention.

The front face of the structural part 3 (i.e. that face which is intended to be at least partially covered by the cover element) of the component 2 according to the invention, is shown in FIG. 5. The structural part 3 has a second snap-in element 23 for cooperating with the first snap-in element 22. Moreover, the structural part 3 has a receiver adapted to the cover part 1, for example a frame-like receiver for the cover element 1 (which is, for example, also frame-like). The structural part 3 also has a plurality of second sliding elements 19, 20, 21, four thereof, for example, being respectively provided on the longitudinal sides of the frame-like receiver and being denoted by the reference numeral 19, three, for example, being provided on one of the narrow sides of the frame-like receiver and being denoted by the reference numeral 20 and two, for example, being provided on the other of the narrow sides of the frame-like receiver and being denoted by the reference numeral 21.

Figure 6A:
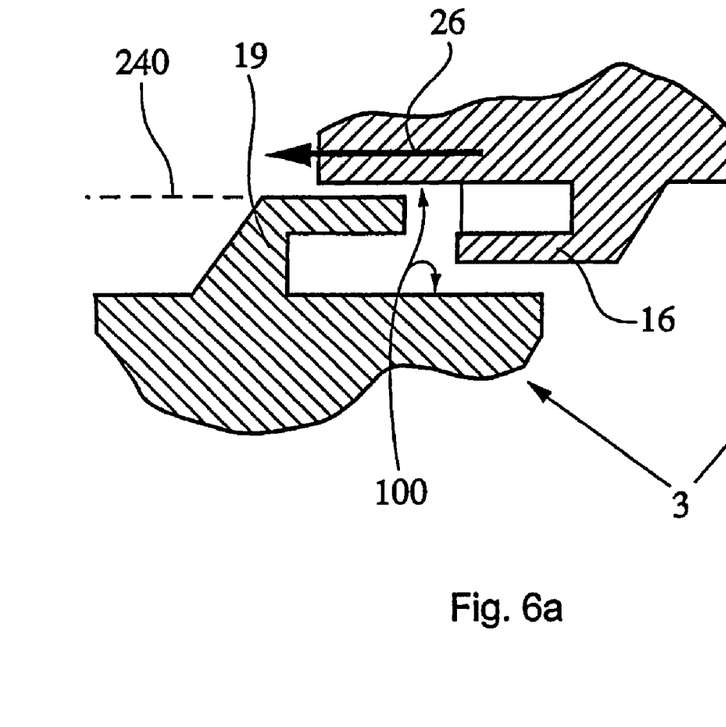
FIGS. 6a and 6b show an enlarged view of the movement effecting the connection and/or the elements effecting the connection.
Figure 6B:
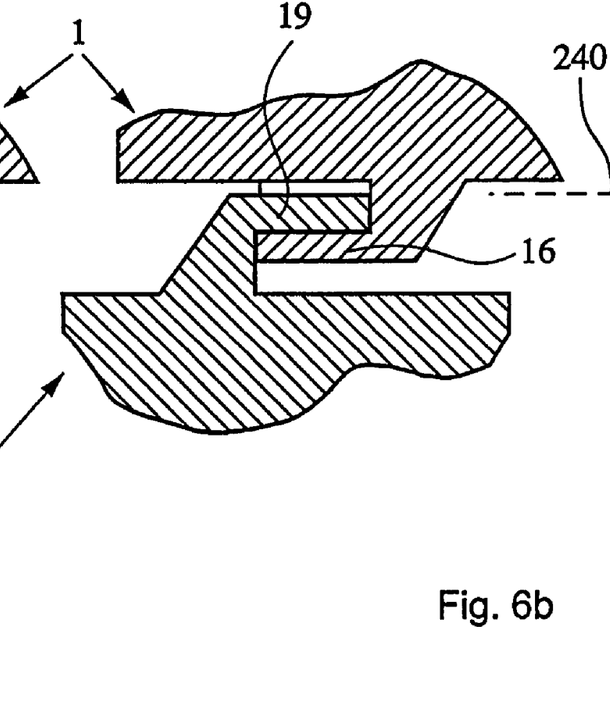

An enlarged view is shown in FIGS. 6a and 6b of the movement effecting the connection between the structural part 3 and the cover element 1 and/or the sliding elements effecting the connection, the reference numeral 16, for example, being used for the first sliding element and the reference numeral 19, for example, being used for the second sliding element.

The state before carrying out the sliding movement 26 is shown in FIG. 6a. The first sliding element 16 is not yet engaged in the second sliding element 19, so that the cover element 1 is also not yet locked relative to the structural part 3 in a direction (not separately denoted by a reference numeral in the figure) perpendicular to the plane 240. It may be provided according to the invention that the sliding elements 16, 19 in this situation are in contact with a sliding surface 100 and thus a stop is formed in the direction perpendicular to the plane.

By means of the connecting movement 26 which is carried out in a direction 25 which is tangential to the one main extension direction 250 of the cover element 1, the state shown in FIG. 6b is reached in which the cover element 1 is locked relative to a movement perpendicular to the plane 240.

Figure 7:
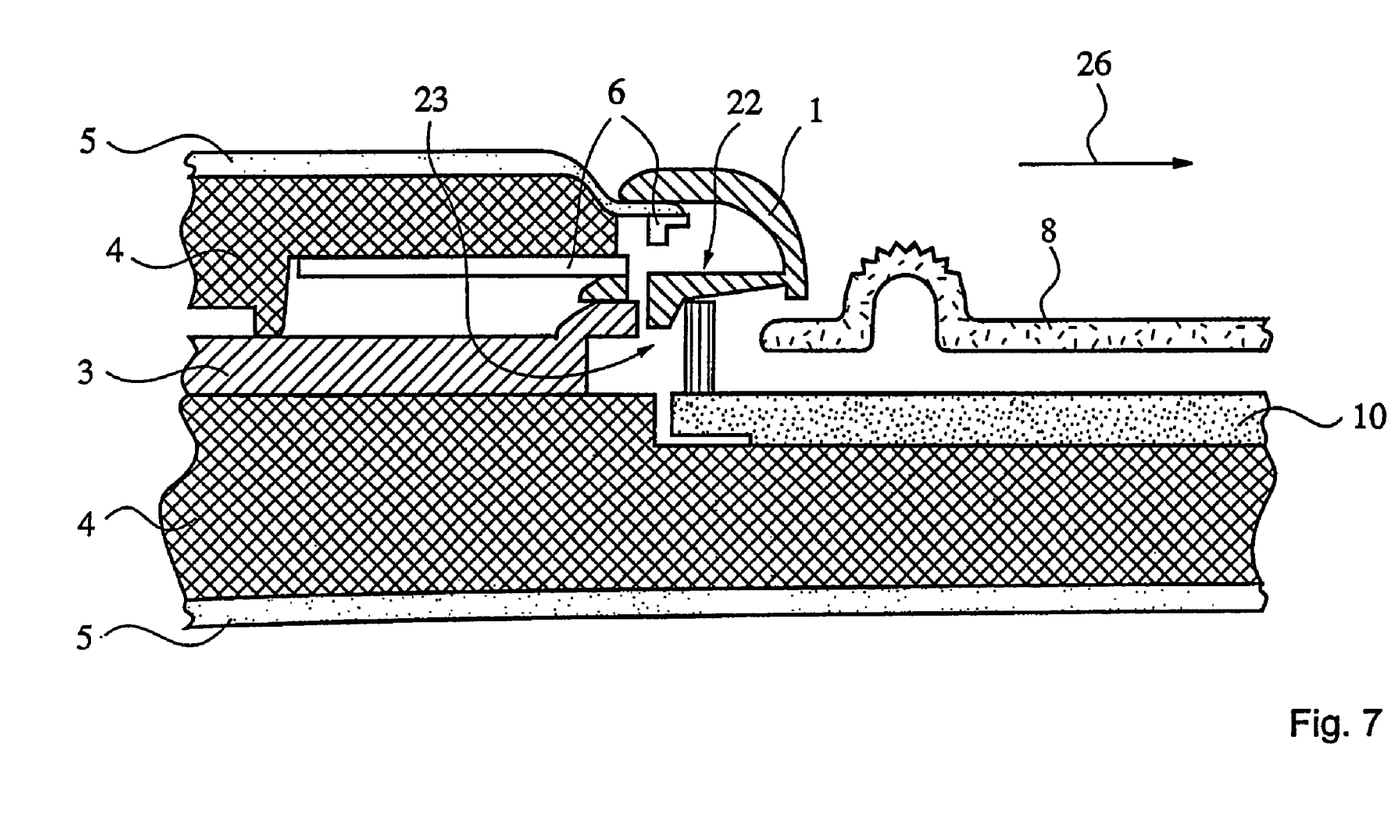
FIG. 7 shows an enlarged view of a snap-in connection for locking the cover element relative to a movement in the direction of the connecting movement.

An enlarged view is shown in FIG. 7 of a snap-in connection of the first snap-in element 22 with the second snap-in element 23, for locking the cover element 1 relative to a movement in the direction 25 which is tangential to the main extension direction 250. In addition to the cover element 1, the structural part 3, the first snap-in element 22 and the second snap-in element 23, also shown are the molded body 4 (respectively for the upper face and for the lower face), the decorative material 5 (also respectively for the upper face and for the lower face), the mirror 10, the sliding cover 8 and the fastening element 6.

The invention claimed is:

1. A component that is designed for use in a vehicle, comprising:
    a structural part and a frame, the frame connected to the structural part by a removable connection, so that a connecting movement of the frame relative to the structural part is provided to produce the connection, in a direction substantially tangential to at least one main extension direction of the frame, the at least one main extension direction of the frame being substantially in a plane, and the connecting movement is carried out substantially in the plane;
    at least one first sliding element on the frame, the at least one first sliding element being arranged in the plane;
    at least one second sliding element on the structural part, the at least one second sliding element cooperates with the at least one first sliding element for locking the frame to the structural part at least relative to a movement perpendicular to the plane; and
    a snap-in connection provided between the frame and the structural part for locking the frame to the structural part relative to a movement in the plane;
    wherein the component is a sun visor with a mirror, the frame being provided at least for covering an edge region of the mirror; and
    wherein the frame defines a substantially rectangular opening having first and second longitudinal sides and first and second narrow sides, and wherein the at least one first sliding element comprises a narrow-side sliding element on at least one of the first and second narrow sides.

2. The component of claim 1, wherein the at least one first sliding element comprises narrow-side sliding elements on the first and second narrow sides.

3. The component of claim 1, wherein the at least one first sliding element further comprises longitudinal-side a sliding element on at least one of the first and second longitudinal sides.

4. The component of claim 3, wherein the at least one first sliding element further comprises longitudinal-side sliding elements on the first and second longitudinal sides.

5. The component of claim 1, wherein the at least one first sliding element further comprises longitudinal-side sliding elements on the first and second longitudinal sides and narrow-side sliding elements on the first and second narrow sides.

6. The component of claim 1, wherein an initial locking engagement for retaining the frame to the structural member takes place by the connecting movement.

7. The component as claimed in claim 1, wherein the snap-in connection is reversibly removable.

8. A sun visor for use in a vehicle, comprising:
    a frame having a first set of sliding elements;
    a structural part having a second set of sliding elements disposed on a first side of the structural part;
    at least one of a body part and a decorative material overlying at least a portion of the first side of the structural part;
    the frame overlying one of the body part and the decorative material, the frame having at least one main extension direction substantially in a plane, and the first set of sliding elements is configured to interconnect with the second set of sliding elements to lock the frame to the structural part with at least one of the body part and the decorative material therebetween, at least relative to a movement perpendicular to the plane, at least one of the first set of sliding elements and the second set of sliding elements being in the plane, the first set of sliding elements and the second set of sliding elements being arranged to be locked by a connecting movement of one of the frame and the structural part, relative to the other, the connecting movement being carried out in the plane and in a direction substantially tangential to the at least one main extension direction of the frame;
    a snap-in connection provided between the frame and the structural part for locking the frame to the structural part relative to a movement in the plane; and
    a mirror, the mirror having an edge region at least partially covered by the frame; and
    wherein the frame defines a substantially rectangular opening having first and second longitudinal sides and first and second narrow sides, and wherein the first set of sliding elements comprise narrow-side sliding elements on at least one of the first and second narrow sides.

9. The sun visor of claim 8, wherein the first set of sliding elements comprise narrow-side sliding elements on the first and second narrow sides.

10. The sun visor of claim 8, wherein the first set of sliding elements further comprise longitudinal-side sliding elements on at least one of the first and second longitudinal sides.

11. The sun visor of claim 10, wherein the first set of sliding elements further comprise longitudinal-side sliding elements on the first and second longitudinal sides.

12. The sun visor of claim 8, wherein the first set of sliding elements further comprise longitudinal-side sliding elements on the first and second longitudinal sides and narrow-side sliding elements on the first and second narrow sides.

13. The sun visor of claim 8, wherein an initial engagement for retaining the frame to the structural member takes place by the connecting movement.

14. The sun visor of claim 8 wherein the snap-in connection is reversibly removable.

15. A method for producing a component for use in a vehicle, comprising:
   providing a structural part and a frame, the frame having a least one main-extension direction substantially in a plane;
   arranging the frame and the structural part relative to one another such that at least one first sliding element on the frame and at least one second sliding element on the structural part are at least partially in contact, the at least one first sliding element being arranged in the plane and comprising a first set of three sliding elements, the at least one second sliding element comprising a second set of three sliding elements, the first set of three sliding elements and the second set of three sliding elements are configured to be connected respectively by a connecting movement for locking the frame to the structural part at least relative to a movement perpendicular to the plane;
   connecting the frame to the structural part by the connecting movement in a direction substantially tangential to the at least one main extension direction of the frame; and
   connecting a snap-in connection provided between the frame to the structural part for locking the frame to the structural part relative to a movement in the plane;
   wherein the component is a sun visor with a mirror, the frame being provided at least for covering an edge region of the mirror; and
   wherein the frame defines a substantially rectangular opening having first and second longitudinal sides and first and second narrow sides, and wherein one of the first set of three sliding elements is a narrow-side sliding element on at least one of the first and second narrow sides.

16. The method of claim 15, wherein an initial locking engagement for retaining the frame to the structural member takes place by the connecting movement.

* * * * *